United States Patent [19]
Willemin

[11] 3,951,017
[45] Apr. 20, 1976

[54] MACHINE-TOOL, ESPECIALLY AUTOMATIC LATHE

[76] Inventor: André Willemin, Rue du Paddock 46, Bassecourt, Switzerland, 2854

[22] Filed: Dec. 3, 1974

[21] Appl. No.: 529,075

[30] Foreign Application Priority Data
Dec. 10, 1973 Switzerland.................... 17262/73

[52] U.S. Cl................................................. 82/2 R
[51] Int. Cl.²........................................... B23B 3/00
[58] Field of Search ..................................... 82/2 R

[56] References Cited
UNITED STATES PATENTS
3,456,533   7/1969   Firth et al............................ 82/2 R

*Primary Examiner*—Harrison L. Hinson

[57] ABSTRACT

This machine-tool is characterized by the fact that its spindle, which is intended to recieve the work-pieces, as well as its whole tools are carried by a rocking plate, able to rotate around an horizontal axis parallel to its plane, that permits it to occupy at least an inclined position in which its face carrying the tools is downwardly facing, so that the chips produced by the working fall down from themselves without being retained by the said plate.

2 Claims, 5 Drawing Figures

MACHINE-TOOL, ESPECIALLY AUTOMATIC LATHE

The present invention relates to a machine-tool, especially to an automatic lathe.

The drawing shows, by way of example, one embodiment of the object of the invention.

Figure 1:
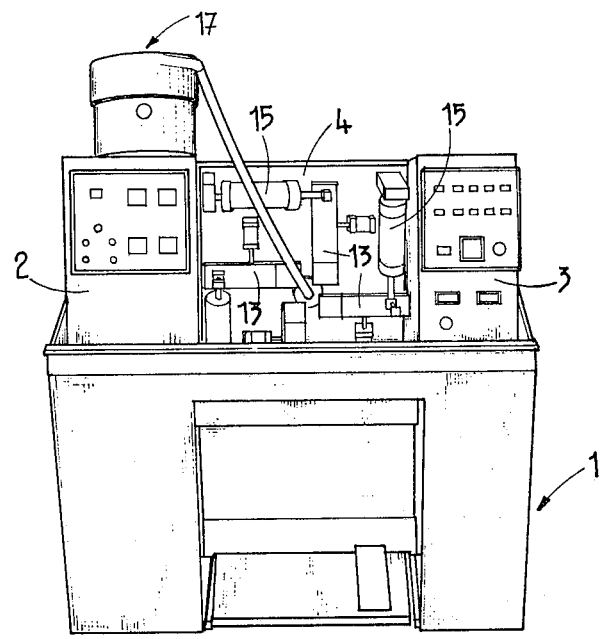
FIG. 1 is a perspective view, from the front side, of an automatic lathe.

The automatic lathe represented comprises a basis 1 supporting two columns 2 and 3 containing, especially, the devices and elements of control of the machine, more particularly the means ensuring its automatic control. This lathe comprises a plate 4, substantially of square shape, arranged between the columns 2 and 3 and which can rotate, between these columns, around an horizontal axis 5 (FIG. 5) passing through its plane. A driving mechanism, diagrammatically represented, carried by one of the columns, for instance column 2, constituted by an hydraulic cylinder 6, the piston of which, not represented, is connected, by a rod 7, to a link 8 rigid with the shaft 5, permits to rock the plate 4 around its axis.

The plate carries, at its centre, a rotative spindle 9 intended to receive the workpieces and which is driven, by means of a belt 10, by a motor 11 situated behind the plate, and which is carried by the plate.

Figure 2:
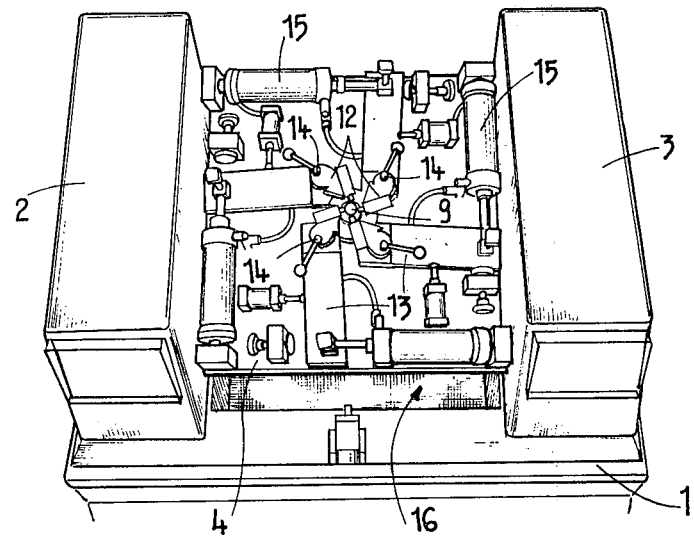
FIG. 2 is a perspective view, from above, of a portion of this lathe, at a larger scale, and in a different position of its operating members.

The tools, constituted by cutters 12 which have been represented only in FIG. 2, are carried by supports 13 articulated each at 14 on the front face of the plate 4 and which are submitted to the action of hydraulic cylinders 15 permitting to move them and, accordingly, to approach or remove the tools from the workpiece.

Owing to the arrangement as disclosed and represented, the plate 4 can rock around its axis 5 for occupying anyone of several positions from the horizontal one (FIG. 2) in which its front face carrying the tools 12 is facing upwardly, to an inclined position (FIGS. 3 to 5) in which its front face carrying the tools is facing downwardly, while passing by a vertical position represented in FIG. 1.

Figure 3:
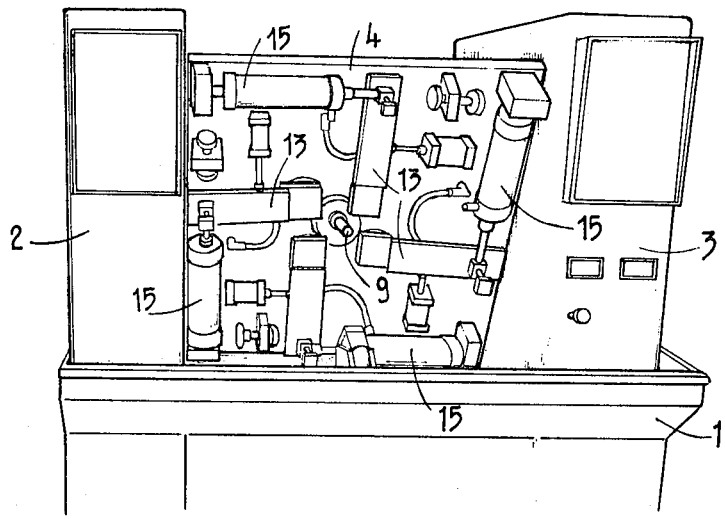
FIG. 3 is a perspective view, from the front side, also at a larger scale, of this lathe, in still another position of its operating members.
Figure 4:
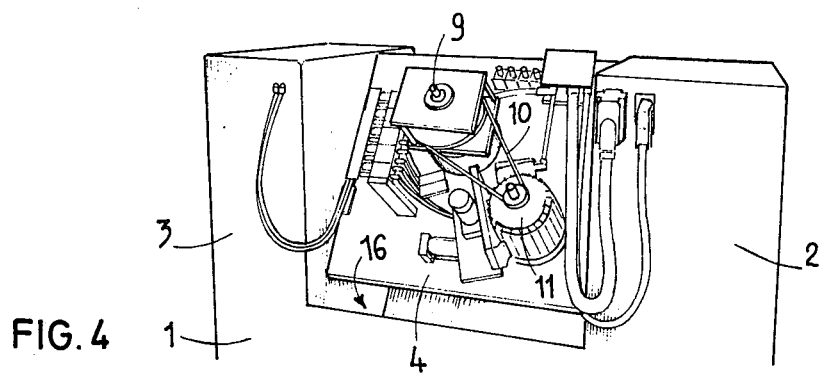
FIG. 4 is a perspective view, from the rear side, of the lathe in the position represented in FIG. 3, and, FIG. 5 is a diagrammatic view, in elevation, of a detail.
Figure 5:
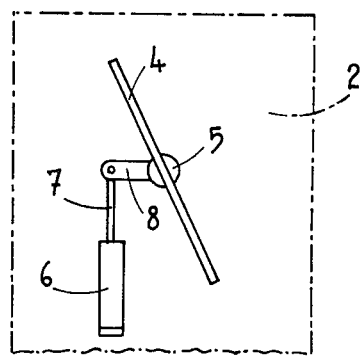

The advantage of this arrangement lies in the fact that, in the inclined position of the plate, represented in FIGS. 3 to 5, the chips produced during the working fall from themselves, without touching the plate, in a room 16 situating in the base 1.

The horizontal position of the plate (FIG. 2) permits to easily adjust the machine, the tools remaining from themselves in the position in which one places them before locking them.

At least, the vertical position of the plate permits to load easily the machine manually, the plate then facing the operator which manually places the workpieces on the spindle.

It is to be noted that at FIG. 1 an automatic loading device has been diagrammatically represented at 17.

It is also to be noted that the lathe as disclosed and represented could also operate as a bar turning machine provided it be fitted with a feeding device. Moreover one could provide the case where some cutters 12 would be replaced by boring or drilling spindles.

What I claim is:

1. A machine-tool, especially an automatic lathe, having a spindle for rotating workpieces as well as at least one tool disposed for working engagement with a workpiece on said spindle, a substantially planar rocking plate on which said spindle as well as said tool are carried, said plate being mounted for rotation about a horizontal axis parallel to its plane, said rocking plate being tiltable about said axis to an inclined position in which its tool-carrying face faces downwardly, such that the chips from a workpiece on said spindle fall freely from the workpiece without being retained by said rocking plate.

2. A machine-tool as defined in claim 1 wherein said rocking plate is mounted so that it can be pivoted from a horizontal position in which said tool-carrying position is disposed upward to said inclined position while passing through an intermediary vertical position.

* * * * *